(12) United States Patent
Kerpash, Sr.

(10) Patent No.: US 7,669,876 B2
(45) Date of Patent: Mar. 2, 2010

(54) LOW PROFILE TRAILER HITCH

(76) Inventor: Robert S. Kerpash, Sr., 1104 Bohemian Church Rd., Troy, MO (US) 63379

( * ) Notice: Subject to any disclaimer, the term of this patent is extended or adjusted under 35 U.S.C. 154(b) by 158 days.

(21) Appl. No.: 11/654,170

(22) Filed: Jan. 17, 2007

(65) Prior Publication Data

US 2008/0169628 A1 Jul. 17, 2008

(51) Int. Cl.
*B60D 1/54* (2006.01)
(52) U.S. Cl. ............... 280/491.3; 280/479.2; 280/491.1
(58) Field of Classification Search ............ 280/491.1, 280/491.3, 491.4, 477, 478.1, 479.2
See application file for complete search history.

(56) References Cited

U.S. PATENT DOCUMENTS

| | | | |
|---|---|---|---|
| 2,378,504 A | | 6/1945 | Roos |
| 4,509,769 A | | 4/1985 | Weber |
| 5,088,754 A | * | 2/1992 | Skelton .................... 280/491.3 |
| 5,288,095 A | * | 2/1994 | Swindall .................. 280/479.2 |
| 6,149,181 A | * | 11/2000 | Biederman ............... 280/491.1 |
| 6,189,910 B1 | * | 2/2001 | Bartel ..................... 280/491.2 |
| 6,527,292 B2 | * | 3/2003 | Adair ..................... 280/491.3 |
| 6,595,540 B1 | * | 7/2003 | MacKarvich ............ 280/491.3 |
| 6,712,381 B1 | | 3/2004 | Moss |
| 6,729,637 B2 | * | 5/2004 | Wolters et al. ........... 280/491.3 |
| 6,971,663 B1 | * | 12/2005 | Blake ........................ 280/507 |
| 7,004,490 B2 | | 2/2006 | Klar |
| 7,052,032 B1 | * | 5/2006 | Adair ..................... 280/479.3 |
| 7,338,064 B1 | * | 3/2008 | Williams ................. 280/491.3 |
| 2002/0003342 A1 | * | 1/2002 | Slatten .................... 280/479.3 |

* cited by examiner

*Primary Examiner*—Paul N Dickson
*Assistant Examiner*—Tashiana Adams
(74) *Attorney, Agent, or Firm*—John C. McMahon

(57) ABSTRACT

A low profile trailer hitch includes a frame for attachment to a vehicle and a draw bar pivotally attached to the frame that includes upper and lower substantially similar curved plates, a stationary stop plate and a plurality of apertures for extending stop pins through both the upper and lower plates. The draw bar has a first towing position wherein the draw bar abuts against the stationary stop plate of the frame with a trailer coupling end of the draw bar extending outwardly away from a bumper of a vehicle upon which the hitch is mounted. The draw bar may be pivoted to a storage position with the coupling end disposed at a location substantially adjacent or within a periphery of the bumper and captured in the storage position by stop pins extending through the upper and lower plates.

13 Claims, 3 Drawing Sheets

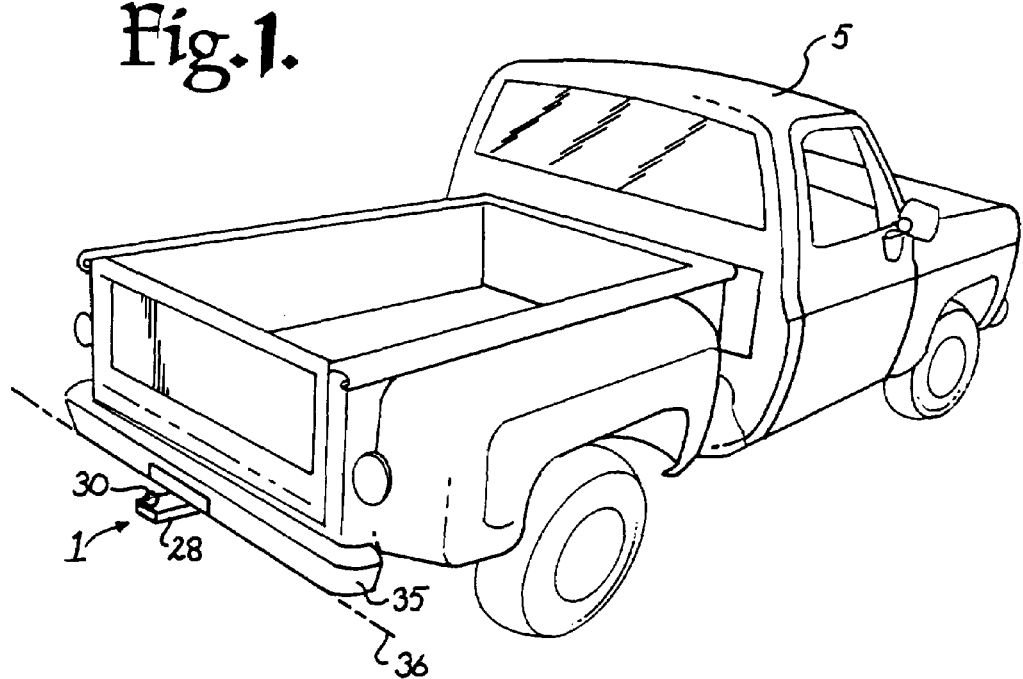
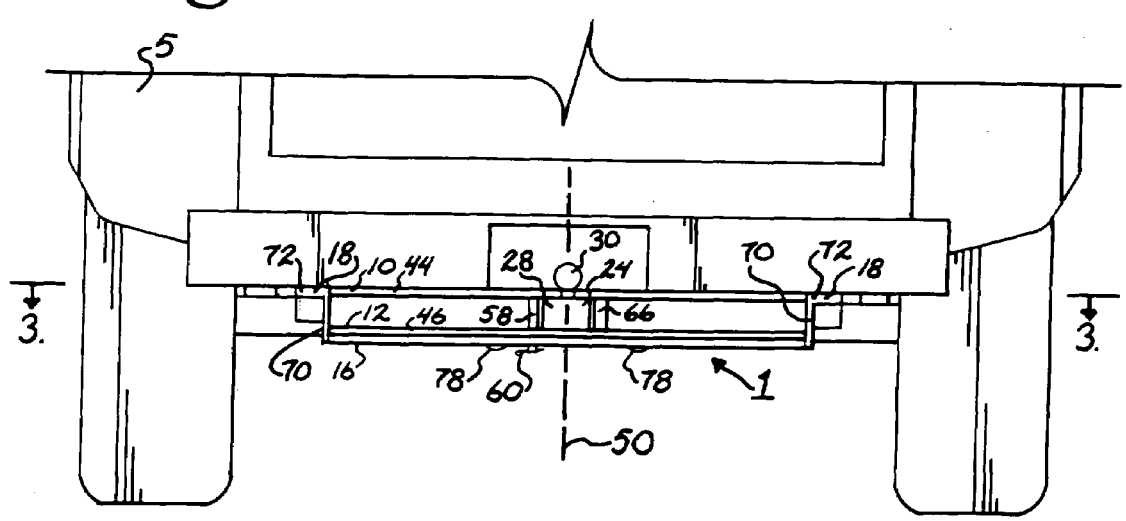

US 7,669,876 B2

LOW PROFILE TRAILER HITCH

BACKGROUND OF THE INVENTION

The present application relates to attachment and holding apparatus, and in particular, to a trailer or tow hitch mounted on a vehicle, and furthermore to such a hitch that has a drawbar that is movable to a lateral position near the vehicle bumper when the hitch is not in use.

Vehicle hitches or tow bars that are permanently mounted either rearward or forward of a vehicle are often problematic when not in use as such towing devices extend a distance from the vehicle bumper, presenting challenges when backing up, parking, and the like. It is known in the art to provide towing devices that are designed such that they may be pivoted upwardly and stored on the vehicle when not in use. However, such devices may be unwieldy and cumbersome for a single operator to move, hold and lock into place. Also, such devices, even in a stored position may be in the way when accessing the vehicle. Therefore, it is desirable to provide for a trailer or tow hitch permanently mountable on a vehicle but also easily movable to an out-of-the-way, non-towing or storage position.

SUMMARY OF THE INVENTION

A trailer hitch apparatus according to the invention includes a frame and a draw bar having an end portion for connection with a trailer or other item to be towed. The draw bar is pivotally attached to the frame at a location spaced from the end portion thereof. The hitch frame is sized and shaped for positioning and fixing the frame to the vehicle at a location within a periphery of the vehicle. The draw bar has a first towing position wherein the draw bar is fixed with respect to the frame at a location with the end portion extending outwardly away from the vehicle periphery. The draw bar may be pivoted in a substantially horizontal plane to a second storage position with the draw bar being fixed with respect to the frame at a location with the end portion disposed adjacent or within the vehicle periphery.

In the illustrated embodiment the hitch frame includes upper and lower curved plates with the draw bar being disposed between the upper and lower plates and pivotally connected to at least one and preferably both plates. The frame further includes a stop in the form of a stationary or fixed plate attached to one and preferably to both the upper and lower plates, the draw bar abutting against the stop when in the first towing position. In the illustrated embodiment, the upper and lower plates further include sets of aligned apertures for the placement of stop pins. These removable pins either capture the draw bar in the first towing position adjacent the stationary stop or in the second storage position wherein the draw bar is captured between two stop pins located laterally of the stationary stop.

OBJECTS OF THE INVENTION

Therefore, objects of the present invention include: providing a trailer hitch or towing apparatus that is readily moveable from a towing position to a storage or "out of use" position wherein the projecting end of the apparatus is located substantially near or inside a periphery of the vehicle bumper; providing such an apparatus that does not require undue upward movement or lifting to move the apparatus to the "out of use" position; providing such an apparatus that is readily mountable at a desired location onto a standard vehicle frame to result in a low profile out-of-the-way storage position; providing such an apparatus that is inexpensive to produce and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWING

FIG. 1 is a perspective view of a vehicle with a trailer hitch apparatus according to the invention mounted thereon.

FIG. 2 is an enlarged rear elevational view of the vehicle and trailer hitch apparatus of FIG. 1.

DETAILED DESCRIPTION OF THE INVENTION

Figure 3:
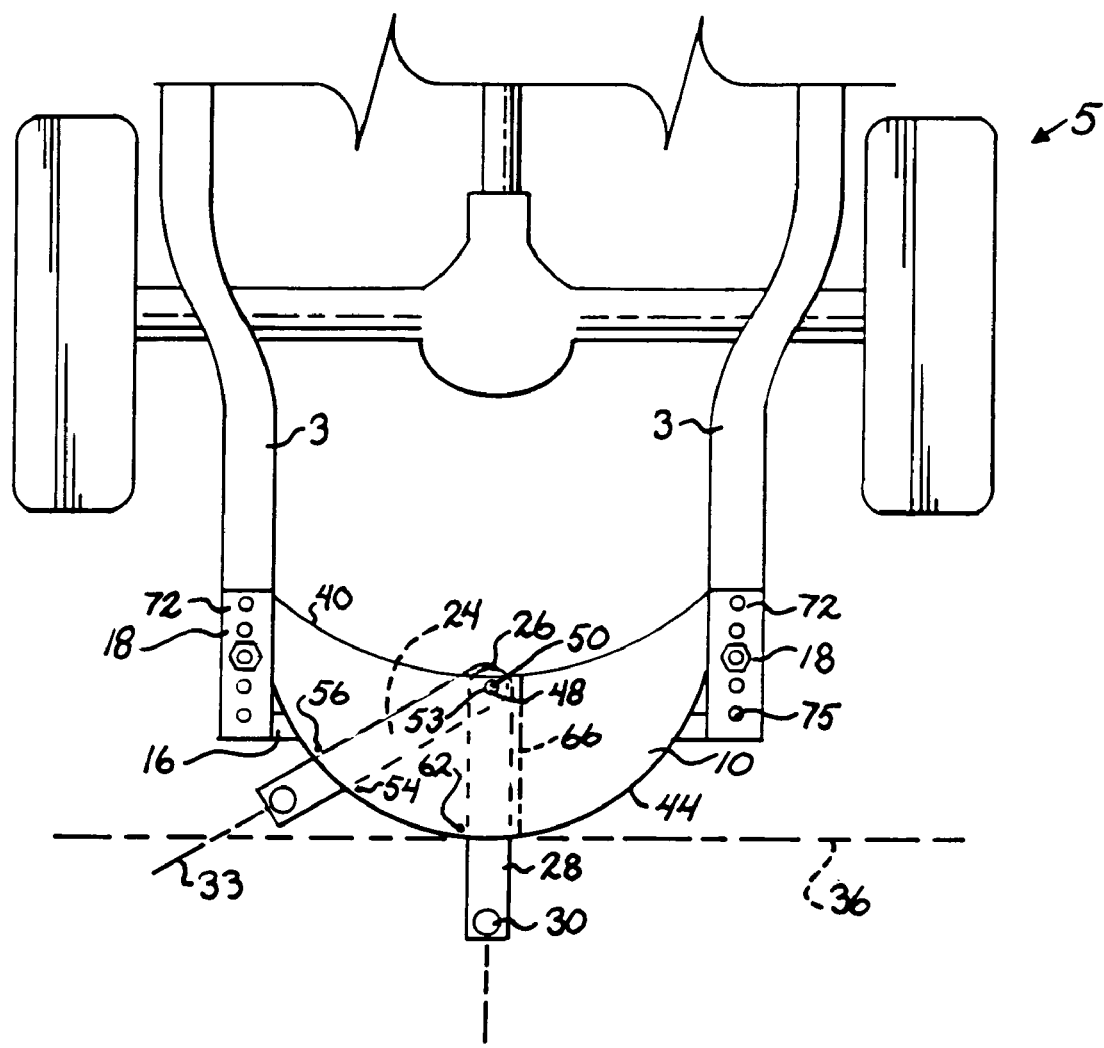
FIG. 3 is a cross-sectional view taken along the line 3-3 of FIG. 2 showing the trailer hitch in phantom being moved from a towing position to an out-of-use position.
Figure 4:
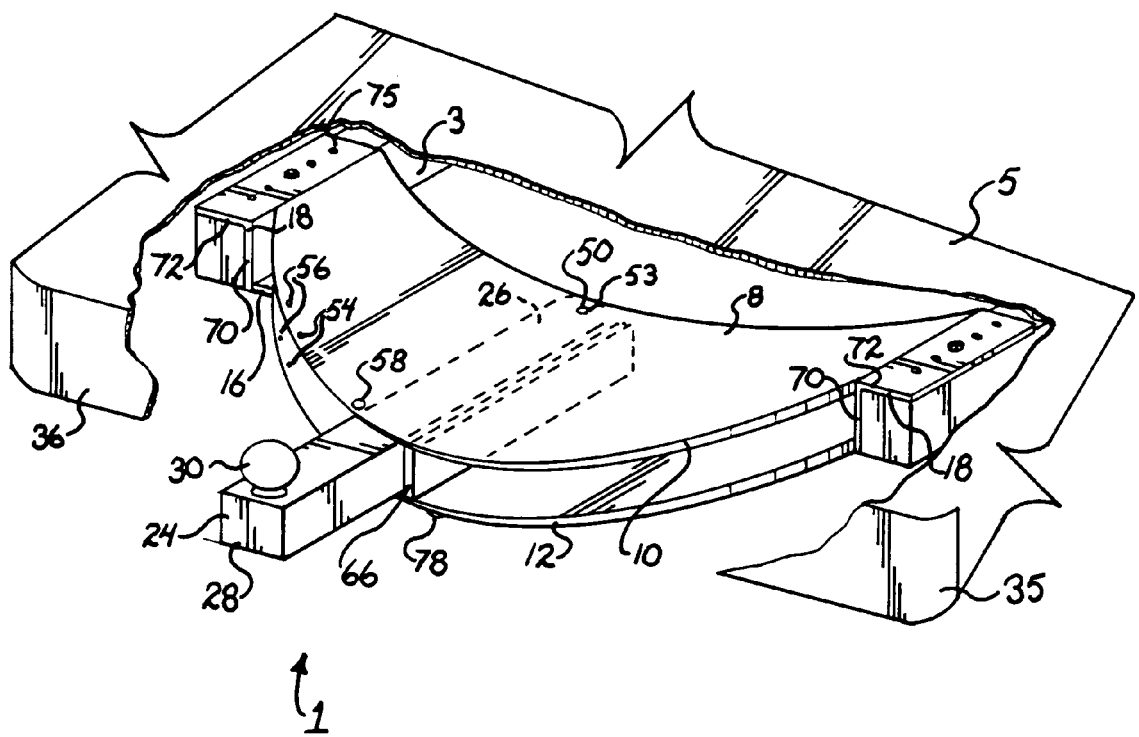
FIG. 4 is an enlarged and partial perspective view of the vehicle and trailer hitch of FIG. 1 with portions removed to show the detail thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

With reference to FIGS. 1-4, the reference numeral 1 generally designates a trailer hitch apparatus according to the invention for mounting on a frame 3 of a vehicle 5. Specifically, the apparatus 1 includes a hitch frame 8 having an upper support plate 10 spaced from a lower support plate 12, a bottom or base support member 16, a pair of frame mounting members 18, a pivotable tow or draw bar 24 with a pivot end portion 26 and a tow coupling end portion 28, the illustrated end portion 28 being equipped with a conventional hitch coupling with a hitch ball 30.

The upper and lower support plates 10 and 12 are substantially evenly spaced from one another and are substantially identical in size and shape. Each plate 10 and 12 is welded or otherwise fixed to each of the pair of frame mounting members 18 that hold the plates 10 and 12 in proper spaced relationship. The plates 10 and 12 are spaced apart a distance to receive the draw bar 24 therebetween such that the bar 24 is free to pivot in a substantially horizontal plane parallel to the plates 10 and 12, between an operational position, indicated by a reference line 32 in FIG. 3, and a storage position, indicated by a reference line 33, with the coupling end portion 28 stowed away near or within a periphery of the vehicle 5, which in the illustrated embodiment is a rear bumper 35. Also, as illustrated in FIG. 3, when in a storage or "out of use" position, the coupling end portion 28 is substantially located within an outer periphery 36 of the bumper 35. Depending upon the position of the vehicle frame 3 with respect to the hitch frame 8 and the bumper 35, the hitch ball 30 may interfere with storage of the end portion 28 entirely within the outer periphery 36 of the bumper 35. However, in such a case the hitch ball 30 would be adjacent or in very close proximity to the bumper 35 and well out of the way when in the storage position. It is foreseen that in other embodiments according to the invention wherein the end portion 28 includes other types of trailer couplings known in the art, the entire tow bar 24 may be readily stored entirely within the periphery 36. It is noted that the reference to the words upper and lower, vertical, horizontal, or top and bottom, and the like, as used herein refers to the alignment shown in the various drawings, as well as the normal connotations applied thereto, and is not intended to restrict positioning of the apparatus 1 in actual use.

In the illustrated embodiment, the plates 10 and 12 include a substantially concave curved forward face or surface 40 and 42, respectively, and a substantially convex rear face or surface 44 and 46, respectively. Such curved surfaces provide adequate support for the draw bar 24 as well as adequate clearance for other vehicle components and clearance for pivoting of the draw bar 24 to the storage position 33. It is foreseen that in other embodiments for other vehicles, other forward and rear surface geometries may be used.

An aligned set of pivot pin apertures or through bores 48 are formed in the plates 10 and 12 near the forward surfaces 40 and 42, respectively, and substantially centrally between the frame mounting members 18. The apertures 48 align along a pivot axis 50 running substantially perpendicular to the two plates 10 and 12. The apertures 48 are sized and shaped to receive a pivot pin 52 with adequate clearance for rotation of the pin 52, the pivot pin 52 also extending through an aperture or through bore 53 disposed in the pivot end portion 26 of the draw bar 24.

Each of the plates 10 and 12 further include a set of spaced apertures 54 and 56, aligned, sized and shaped for insertion of stops pins 58 therethrough, the apertures 54 and 56 of the plate 10 being in substantial vertical alignment with the apertures 54 and 56 in the plate 12. The apertures 54 and 56 are spaced from one another on each of the plates a distance slightly greater than a width of the draw bar 24. The sets of apertures 54 and 56 are also disposed near the rear faces 44 and 46. The apertures 54 and 56 are located such that when the draw bar is pivoted to the storage position indicated by the line 33, the stop pins 58 may be extended through the apertures 54 and 56, capturing the draw bar 24 in the storage position 33 with the draw bar coupling end portion 28 disposed within the bumper periphery 36 as illustrated in FIG. 3. The pins 58 may be secured using retaining clips 60 or other securing clips or pins known in the art. Alternatively, the pins 58 may be in the form of bolts or other fastening devices secured with a nut and lock washer to hold the bolt in place.

The plates further include substantially vertically aligned apertures 62 also sized and shaped for insertion of a stop pin 58 therethrough. The apertures 62 are located near the rear surfaces 44 and 46 and spaced from a stationery stop plate 66. The apertures 62 are spaced from the stop plate 66 a distance slightly greater than a width of the draw bar 24. The apertures 62 and the plate 66 are located such that when the draw bar is pivoted to the towing or "in-use" position indicated by the line 32, a stop pin 58 may be extended through the apertures 62, capturing the draw bar 24 between such stop pin 58 and the stop plate 66. Similarly to what was stated above, the stop pin 58 may be clipped, bolted, or otherwise fixed to the plates 10 and 12 to provide for a secure capture of the draw bar 24 until it is desirable to remove the pin 58 and pivot the draw bar 24 to the "out-of-use" or storage position 33.

The illustrated stop plate 66 is fixed to both the upper and lower support plates 10 and 12 and extends therebetween. The stop plate 66 is substantially perpendicular to the plates 10 and 12 and also extends between the forward faces 40 and 42 and the rear faces 44 and 46 of the respective plates 10 and 12, providing stability to the hitch frame 8 as well as a stop to capture the draw bar 24 in an appropriate towing position.

The frame mounting members 18 disposed at either end of the support plates 10 and 12 are L-shaped with a first section or plate portion 70 substantially perpendicular to a second section or plate portion 72. Each of the sections 70 are welded or otherwise fixed to the support plates 10 and 12 and the base support 16, the sections 70 being disposed substantially perpendicular to the plates 10 and 12 and the base support 16. The sections 72 extend laterally outwardly the plates 10 and 12 and are sized and shaped to extend over top portions of the vehicle frame 3. The sections 72 include a plurality of apertures 75 for alignment with apertures in the vehicle frame 3. The plurality of apertures 75 allow for a more forward or a more rearward positioning of the hitch frame 8 with respect to the vehicle frames 3, allowing for mounting the apparatus on a variety of vehicle frames in a position to result in the coupling end portion 28 of the draw bar 24 being in a position that extends from the bumper 36 for towing and yet pivots to a low profile, out-of-the-way position during storage. The hitch frame 8 is secured to the vehicle frame 3 by bolts extending through the apertures 75 and apertures in the vehicle frame 3. It is also foreseen that the hitch frame 8 may be welded or otherwise fixed to the vehicle frame 3. The assembly 1 further includes a safety hook or hooks 78 for attachment of safety chains and other safety equipment and accessories as known in the art.

The base support member 16 provides additional stability to the apparatus 1. In the illustrated embodiment, the member 16 is an elongate a substantially rectangular plate that is welded or otherwise fixed at either end to one of the frame mounting members 18. The support member 16 is located below and adjacent to the lower support plate 12. The support member 16 and all other components of the apparatus 1 may be machined from steel or other materials exhibiting adequate strength for towing trailers of various weights.

As previously stated, during operation, the draw bar is captured between a pin 58 disposed in the apertures 62 and the stop plate 66. When not in use, the pin 58 may be removed from the apertures 62 and the draw bar 24 pivoted about the pivot pin axis 50 to the location 33. Thereafter two stop pins 58 are installed on either side of the draw bar 24 through the apertures 54 and 56, securing the draw bar 24 in an out-of-the-way position. When it is desired to connect the draw or tow bar 24 to a trailer or other item to be towed, the steps for storing the draw bar are reversed. It is foreseen that this operation may be performed either manually or with an electronic control system (not shown).

It is to be understood that while certain forms of the present invention have been illustrated and described herein, it is not to be limited to the specific forms or arrangement of parts described and shown.

What is claimed and desired to be secured by Letters Patent is as follows:

1. In a trailer hitch front end section having a ball for permanently mounting on a towing vehicle, the improvement wherein:

the hitch front end section comprises a frame and a draw bar, the draw bar having a first end portion having the ball and adapted for connection with a trailer through a hitch rear section, the draw bar having a second end portion permanently and pivotally attached to the frame by a pivot pin at a location spaced from the first end portion, the frame sized and shaped for positioning and fixing the frame to the towing vehicle at a location within a periphery of the vehicle, the draw bar having a first towing position wherein the draw bar swings on the pivot pin so that the first end portion with the ball swings outwardly and is then fixed with respect to the frame with the first end portion extending outwardly away from the towing vehicle periphery and a second storage position wherein the draw bar is pivoted on the pivot pin so that the first end portion with the ball swings inwardly and is then fixed with respect to the frame at a location with the first end portion substantially disposed within the towing vehicle periphery.

2. The improvement of claim 1 wherein the frame comprises and upper plate and a lower plate and the draw bar is disposed between the upper and lower plates and pivotally connected thereto.

3. The improvement of claim 2 wherein the frame further comprises a stop plate attached to both the upper and lower plates, the draw bar abutting against the stop plate when the draw bar is in the first towing position.

4. The improvement of claim 2 wherein both the upper and lower plates are curved.

5. The improvement of claim 2 wherein the upper and lower plates include a plurality apertures and the draw bar is fixed relative to the upper and lower plates by stop pins extending through both the upper and lower plates.

6. The improvement of claim 5 wherein the plurality of apertures includes a first set of aligned apertures cooperating with the stop plate for fixing the draw bar in the first position.

7. The improvement of claim 6 wherein the plurality of apertures includes a second set of aligned apertures cooperating with a third set of aligned apertures for fixing the draw bar in the second storage position.

8. A trailer hitch apparatus front end section having a towing ball for mounting on a towing vehicle frame, the apparatus comprising:
  a) a first plate;
  b) a second plate substantially evenly spaced from the first plate;
  c) a stationary stop disposed between the first and second plates; and
  d) a draw bar disposed between the first and second plates, the draw bar being permanently and pivotally attached to at least the first plate by a pivot pin allowing the draw bar to pivot between a towing position and a storage configuration thereof without removal of the pivot pin, the draw bar having a first end portion with the ball extending outwardly from both the first and second plates, the first end portion ball adapted for connection with a trailer vehicle to be towed, the draw bar while in the towing position abuts against the stop and the first end portion extends outwardly away from a bumper of a towing vehicle upon which the apparatus is mounted such that the ball is outside the periphery of the towing vehicle, the tow bar while in the second storage position is fixed with respect to the first and second plates at a location with the first end portion ball substantially disposed within an outer periphery of the towing vehicle, the tow bar having a second end portion opposite the first end portion that is secured to the frame and the towing vehicle by the pivot pin in the towing position, in the storage position and while swinging between the towing and storage positions.

9. The apparatus of claim 8 wherein the first and second plates include a plurality of apertures and the draw bar is fixed in the first position relative to the first and second plates by capture of the draw bar between the stop and a pin extending through a first set of aligned apertures in the first and second plates.

10. The apparatus of claim 9 wherein the plurality of apertures includes a second set of aligned apertures cooperating with a third set of aligned apertures for fixing the draw bar in the second storage position.

11. The apparatus of claim 8 wherein both the first and second plates are curved.

12. A trailer hitch apparatus front end section having a ball and for mounting on a towing vehicle frame, the apparatus comprising:
  a) an upper substantially flat plate;
  b) a lower substantially flat plate evenly spaced from the upper plate, the lower plate having substantially the same size and shape as the upper plate;
  c) an elongate stop plate disposed between the upper and lower plates and fixedly attached to both the first and second plates;
  d) first and second mounting members attached to the upper and lower plates, the mounting members adapted for fixing the apparatus to the towing vehicle frame; and
  e) a draw bar having opposed first and second ends and being disposed between the upper and lower plates and being permanently and pivotally attached to the upper and lower plates at the first end portion by a pivot pin extending through both the upper and lower plates that allows swinging of the second end portion between a towing position and a storage position by swinging of the draw bar on the pivot pin, the draw bar having the ball at the second end portion thereof, and wherein when the first and second mounting members are attached to the towing vehicle frame in the towing position the draw bar is captured between the stop and a first stop pin extending through the upper and lower plates with the ball extending outwardly away from the towing vehicle bumper, and in the storage position the draw bar is captured between second and third spaced stop pins extending through the upper and lower plates at a location with the tow attachment disposed adjacent the bumper and within a perimeter of the towing vehicle, the draw bar remains pivotally attached to the towing vehicle frame aby the pivot pin while in the towing position, in the storage position and during movement between the towing and storage position.

13. The apparatus of claim 12 wherein the mounting members each have a plurality of apertures for attaching the mounting members to the vehicle frame.

* * * * *